United States Patent
Mizue et al.

(10) Patent No.: US 7,862,244 B2
(45) Date of Patent: Jan. 4, 2011

(54) OPTICAL MODULE PROVIDING A SLEEVE BURYING A TUBULAR MEMBER

(75) Inventors: Toshio Mizue, Yokohama (JP); Tomoya Saeki, Yokohama (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 124 days.

(21) Appl. No.: 12/247,441

(22) Filed: Oct. 8, 2008

(65) Prior Publication Data
US 2009/0092362 A1 Apr. 9, 2009

(30) Foreign Application Priority Data
Oct. 9, 2007 (JP) .............. 2007-262984

(51) Int. Cl.
*G02B 6/36* (2006.01)
(52) U.S. Cl. .............. 385/92; 385/88; 385/93; 385/94
(58) Field of Classification Search ........... 385/88, 385/90, 92–94
See application file for complete search history.

(56) References Cited

U.S. PATENT DOCUMENTS

| 4,691,986 | A | * | 9/1987 | Aberson et al. ............... 385/66 |
| 5,633,971 | A | * | 5/1997 | Kurashima .................... 385/78 |
| 6,893,163 | B2 | * | 5/2005 | Sato et al. ...................... 385/78 |
| 6,966,705 | B2 | * | 11/2005 | Sato et al. ...................... 385/88 |
| 6,969,203 | B2 | * | 11/2005 | Low ............................. 385/78 |
| 2003/0128937 | A1 | * | 7/2003 | Sato et al. ...................... 385/78 |
| 2003/0169978 | A1 | * | 9/2003 | Sato et al. ...................... 385/88 |
| 2004/0218872 | A1 | * | 11/2004 | Low ............................. 385/60 |
| 2005/0025433 | A1 | * | 2/2005 | Hung ........................... 385/88 |
| 2005/0036745 | A1 | * | 2/2005 | Nakanishi et al. ............. 385/88 |
| 2005/0286839 | A1 | * | 12/2005 | Yoshikawa .................... 385/92 |
| 2006/0275001 | A1 | * | 12/2006 | Nakanishi et al. ............. 385/93 |
| 2007/0009208 | A1 | * | 1/2007 | Guenter et al. ................ 385/52 |

FOREIGN PATENT DOCUMENTS

| JP | 2005-338407 | 12/2005 |
| JP | 2007-121920 | 5/2007 |

* cited by examiner

*Primary Examiner*—Rhonda S Peace
(74) *Attorney, Agent, or Firm*—Venable LLP; Michael A. Sartori; Justine A. Gozzi

(57) ABSTRACT

An optical module with a sleeve assembly is disclosed. The sleeve assembly, which receives a ferrule secured in an end of the optical connector and is primarily made of resin material, provides a buried member made of a material, typically meal, having a polygonal cross section, a linear thermal expansion coefficient less than that of the resin material and a Young's Modulus greater than that of the resin material. The bore of the sleeve assembly has a deformed circular shape with a first diameter less than the outer diameter of the ferrule.

12 Claims, 3 Drawing Sheets

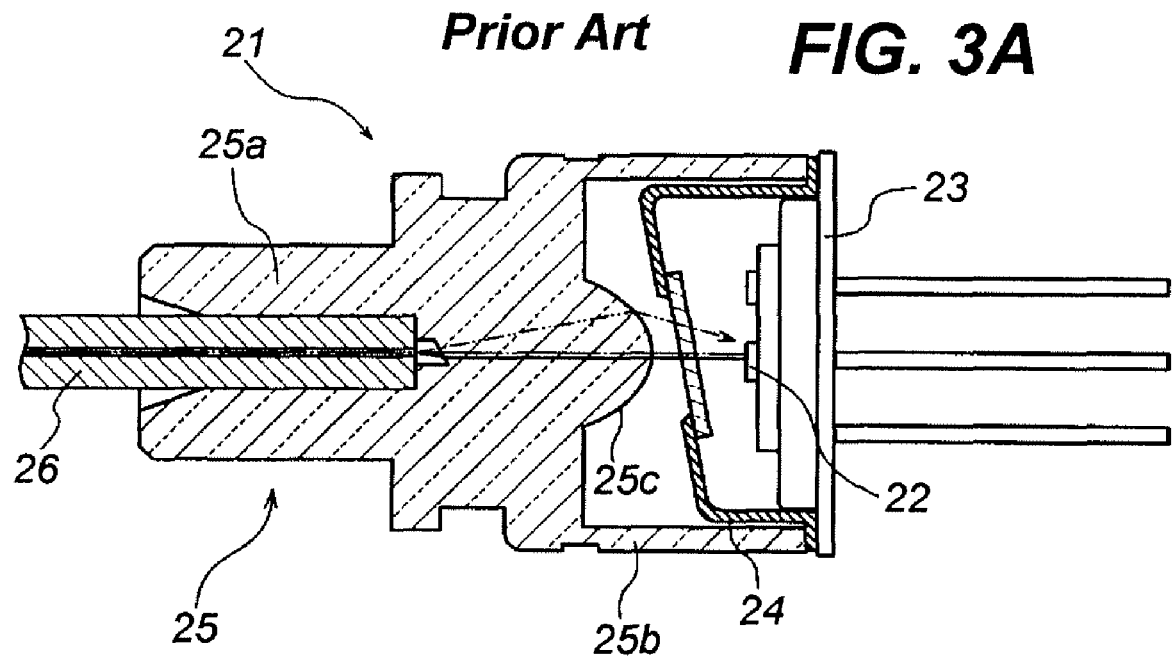
Prior Art  FIG. 3A
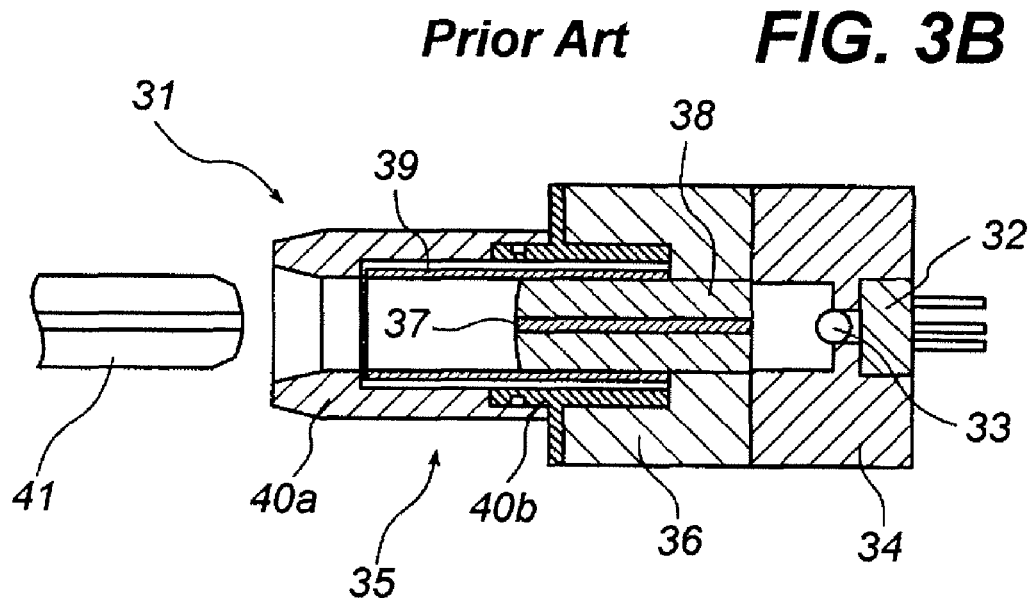
Prior Art  FIG. 3B

OPTICAL MODULE PROVIDING A SLEEVE BURYING A TUBULAR MEMBER

BACKGROUND OF THE INVENTION

1. Field of the Invention

The present invention related to an optical module with a sleeve mated with a ferrule secured in an optical connector.

2. Related Prior Art

An ordinary optical module with a function to transmit optical signal applicable in the optical communication with a large capacity and a high transmission speed implements a semiconductor laser diode (hereafter denoted as LD) with a large output power as an optical signal source. Such an optical module provides an optical receptacle to be mated with an optical connector to couple the optical signal with the optical fiber. The optical receptacle optically aligns a ferrule secured in the optical connector with the LD.

As the optical communication becomes popular to be applied in the consumer field, the cost reduction of the optical module is inevitably and continuously requested in the field. The Japanese Patent Application published as JP-2007-121920A has disclosed an optical module with a sleeve to align the ferrule, a support and optical members, in which these parts are integrally molded with resin.

FIG. 3A schematically illustrates the optical module disclosed therein. The module 21 installs an LD 22 on the stem 23 and air-tightly seals the LD 22 by a cap 24 and the stem 23. The member 25 to support the optical fiber covers the cap 24. The supporting member 25 includes a sleeve portion 25a to receive and to align the ferrule 26 attached in the tip of the fiber, a skirt portion to cover the cap and to be attached in a tip thereof with the stem 23, and a lens portion 25c. The supporting member 25 is made of resin transparent in wavelengths of light transmitted in the optical fiber or that emitted from the LD 22. The skirt portion 25b is fixed to the stem 23 with an adhesive curable by the ultraviolet rays, which enables to fix the skirt portion against the stem in a short time and enhances the alignment accuracy between the lens 25c and the LD 22.

In a practical use of the optical module receiving in the receptacle thereof the optical connector with the optical fiber, it may be occurred that an external force or pressure be applied in a direction perpendicular to an optical axis of the ferrule. That is, swinging the fiber extending from the connector, the optical coupling efficiency between the optical connector and the receptacle, namely, between the fiber and the LD, fluctuates. This phenomenon is often called as the wiggle tolerance. Another optical module disclosed in a Japanese Patent Application published as JP-2005-338407A enhances the Wiggle tolerance by implementing the sleeve made of zirconia ceramics which is stiff and accurate but costly material. Moreover, the optical module disclosed therein provides a sleeve cover made of composite materials of resin and meal in order to enhance the stiffness of the optical module.

Such an optical module 31 is illustrated in FIG. 3B, where the module 31 comprises a body 34 and an optical receptacle 35. The body 35 holds the packaged LD 32 and the lens 33. The optical receptacle 35 is, for instance, welded to the base 34. The receptacle 35 secures and fixes a portion of the fiber stub 38, which is supported by a metal holder 36 and provides a short-lengthened fiber 37 in a center thereof. The sleeve 38 made of, for instance, zirconia and aluminum receives another portion of the stub 38 not supported by the metal holder 36, and is set within the sleeve case 40 that is comprised of a front portion 40a made of resin and a rear portion 40b made of metal. Thus, the mechanical stiffness of the receptacle 35 may be secured.

The first optical module illustrated in FIG. 3A provides the member integrally built with the skirt portion, the sleeve portion and the lens, which may simplify the process to obtain the module and reduce the production cost thereof. However, the optical communication system implementing the single mode fiber is necessary to align the fiber optically with the LD within an alignment accuracy of 1 to 3 μm. Nevertheless, the dimensional accuracy of the mold resin is as much as 3 to 4 μm. Therefore, it is quite hard to attain the required accuracy in the sleeve portion even when the inner shape of the sleeve portion is circular.

Moreover, the thermal expansion co-efficient of the resin material is considerably different from that of zirconia ceramics often used as the ferrule. Thus, the accurate alignment between the ferrule made of ceramics and the resin made sleeve is further unattainable in wider temperature ranges.

In addition, the Young's modulus of the mold resin is about 3 GPa after the curing, which is two figures smaller than that of the ziroconia ceramics, 245 GPa, and stainless steel, 219 GPa. Accordingly, the deformation of the resin sleeve may occur by a force applied perpendicular to the sleeve axis, which varies the optical coupling efficiency between the ferrule and the sleeve and degrades the wiggle tolerance.

SUMMARY OF THE INVENTION

One aspect of the present invention relates to an optical module comprising an optical device, a skirt portion and a sleeve member. The optical device installs a semiconductor optical element therein. The skirt portion is attached to the optical device to align the optical device optically with the optical connector coupled with the optical module. The sleeve assembly includes a sleeve portion with a bore to receive a ferrule secured in the optical connector and a buried member. The buried member, which is buried within the sleeve portion, has a polygonal cross section with a plurality of side portions and a plurality of corner portions so as to surround the bore of the sleeve portion. The present invention has a feature that the bore has a deformed circular cross section such that an inner distance from a center of the sleeve portion to inner walls in the side portion is different from an inner distance from the center to the inner walls in the corner portion.

BRIEF DESCRIPTION OF DRAWINGS

FIGS. 3A and 3B illustrate optical modules with conventional arrangements.

DESCRIPTION OF PREFERRED EMBODIMENTS

Figure 1:
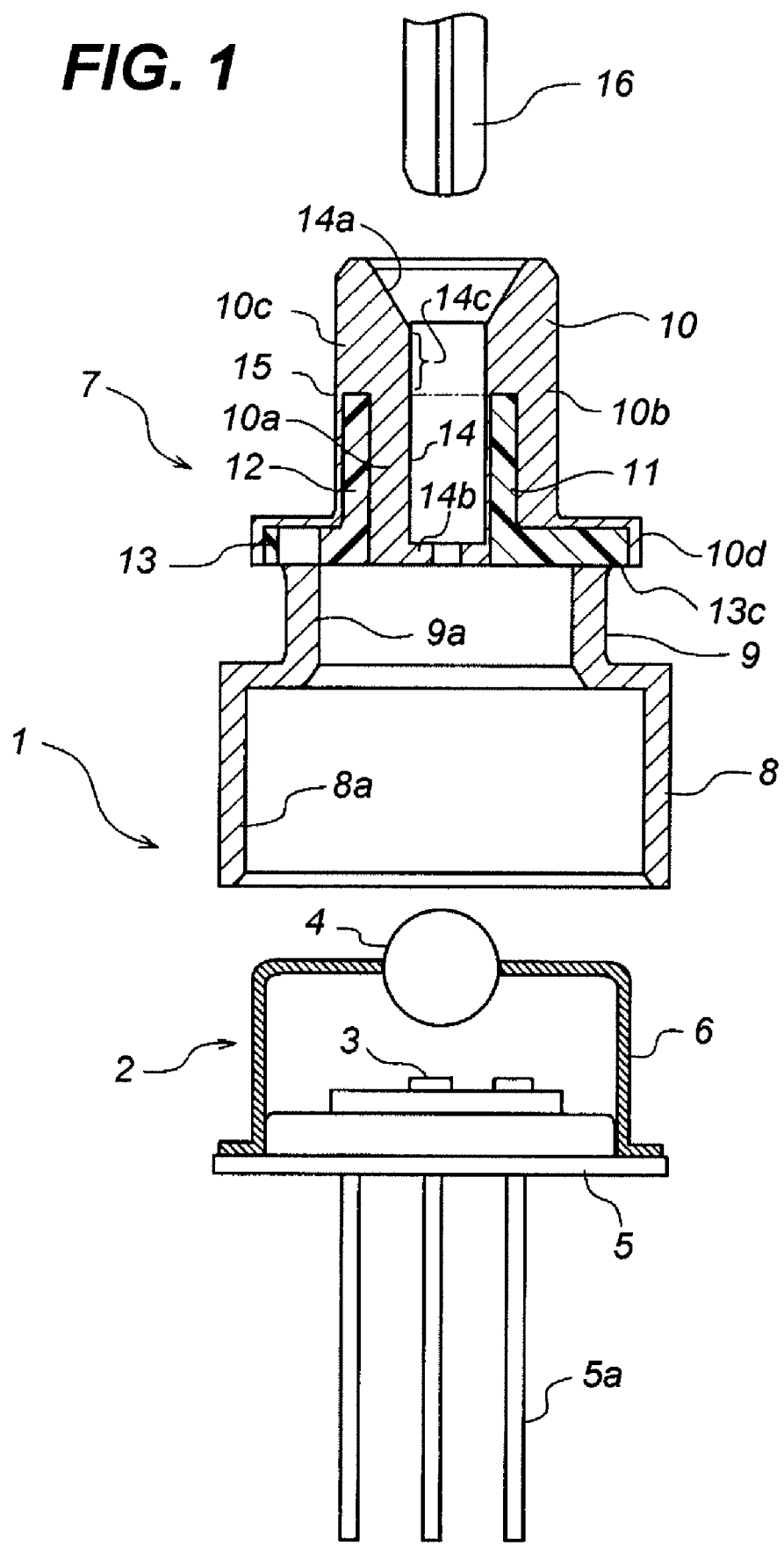
FIG. 1 an exploded cross sectional view of the optical transmitter module according to an embodiment of the module.

FIG. 1 illustrates an exploded cross sectional view of the optical module according to the present embodiment of the invention. The optical module 1 according to the present embodiment comprises an optical device 2 that encloses a semiconductor optical element 3 therein and a sleeve assembly 7 built with the optical element 3. When the optical device implements the LD, the PD and both of the LD the PD, the module is called as an optical transmitter module, the optical receiver module, and the optical bi-directional module, respectively.

The optical device 2 may have a CAN package that comprises a stem 5 with lead pins 5a to mount the element 3 thereon and a cap 6 with a lens 4 in a top thereof to seal the semiconductor element air-tightly. The optical module 1 comprises this optical device 2 and the sleeve assembly 7 optically aligned with the optical device 2.

The sleeve assembly 7 is made of resin and includes a skirt portion 8 and a neck portion 9 and a sleeve portion 10. The neck portion 9 is provided to set this module in a host product such as optical transceiver. The optical transceiver installs this optical transmitter module and an optical receiver module to carry out the full duplex optical communication. The sleeve portion 10 has a cylindrical shape with a bore into which the ferrule 16 is to be inserted. The sleeve portion is necessary to be configured to align the ferrule 16 inserted therein with the optical device so as to show at least a preset optical coupling efficiency therebetween and to maintain this optical coupling efficiency securely. Although the embodiment in FIG. 1 integrally builds the skirt portion 8 and the neck portion 9 with the sleeve portion 10, these portions may be independently formed and permanently fixed each other.

Figure 2A:
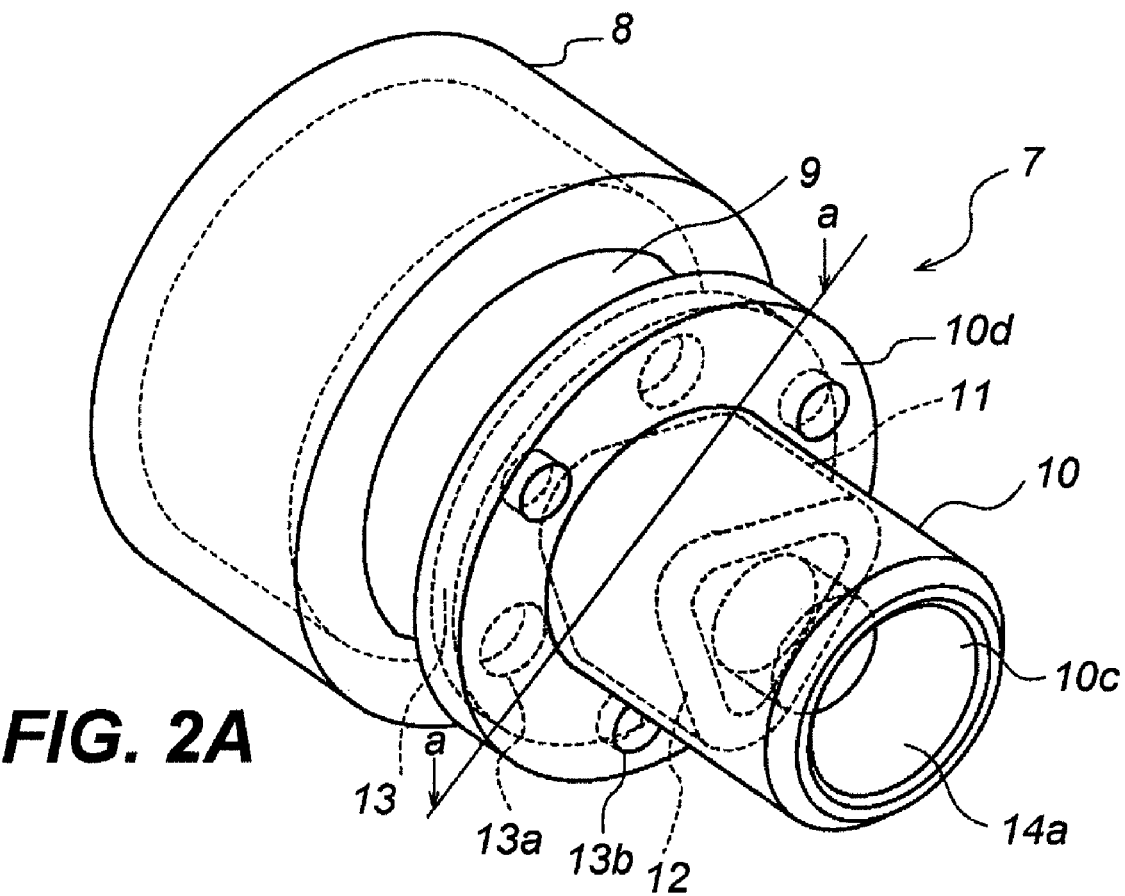
FIG. 2A is a perspective drawing of the optical module where the buried member is illustrated.

The sleeve portion 10 fits a buried member 11 within the cylindrical bore. The buried member 11 has a polygonal cross section and shows a thermal expansion co-efficient smaller than that of the mold resin for the sleeve portion 10 and has a Young's modulus greater than that of the sleeve portion 10. The buried member 11 may be made of metal. FIG. 2A shows an exemplary shape of the buried member. The buried member 11, which may be formed by the press-molding, the injection molding and the die-casting, includes a tubular portion 12 and a flange portion 13. The buried member 11 is covered with the resin in the sleeve portion 10.

The flange portion 13 provides a plurality of openings 13a to facilitate the loading of the resin and other openings 13b to align the buried member 11 with respect to the resin when the mold resin is cured. Moreover, because the buried member 11 may be made of metal and one end surface 13c thereof may expose from the mold resin, this end surface 13c comes in electrically contact with the housing of the transceiver when the module is set thereon, which enhances the EMI shield performance of the transceiver.

The mold resin of the sleeve portion 10 provides the inner side wall 10a that forms the bore 14 into which the ferrule 16 is to be inserted, the outer wall 10b to define the outer shape 10, the guide wall 10c to guide the insertion of the ferrule 16, and the flange cover 10d to wrap the flange portion 13.

The end portion of the bore 14 is chamfered to form the inlet 14a, while the deep end of the bore 14 forms the stopper 14b to define the tip position of the ferrule 16. Between the end of the buried member 11 and the end of the inlet 14a is formed with the tapered wall 14c whose diameters at both ends is different by about 10 µm. A stub, which is not shown in figures and has a shortened fiber in a center thereof, may be replaced with the stopper 14b in the deep end of the bore 14.

Figure 2B:
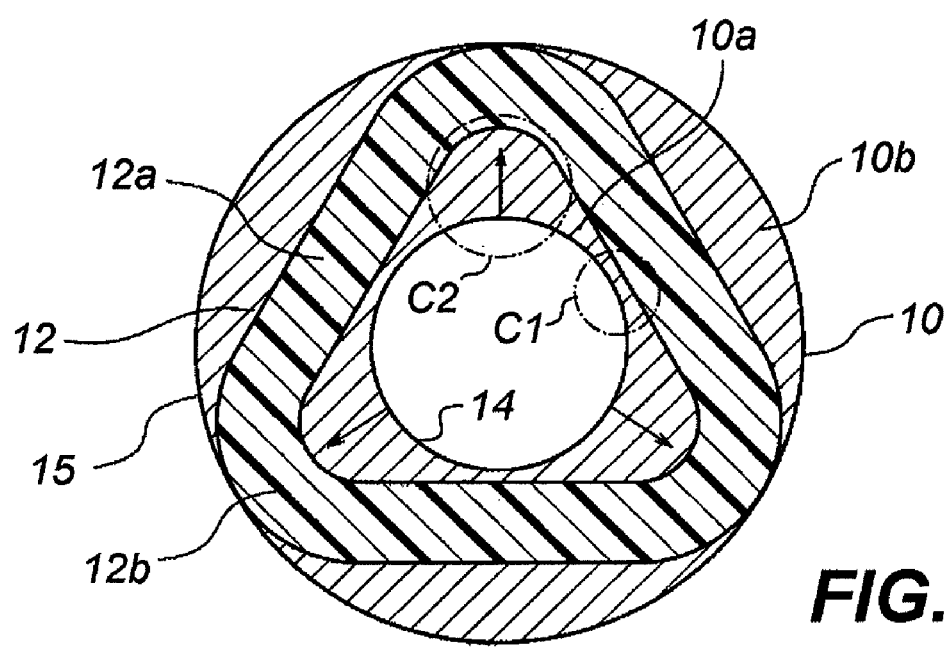
FIG. 2B is a cross section taken along the line a-a marked in FIG. 2A.

The tubular portion 12 has a polygonal cross section with an inner surface thereof being covered with the inner side wall 10a, while an outer surface being covered with the outer wall 10b of the resin made sleeve portion 10, as illustrated in FIG. 2A. The inner side wall 10a provides the bore 14 in a center thereof into which the ferrule 16 is inserted. As illustrated in FIG. 2B, the wall thickness of the guide wall 10c becomes thin at the sides 12a while it becomes thick at the corners 12b.

In the molding process of the sleeve portion 10, the injected resin material may flow in the corners 12b, which may facilitate the injection.

Moreover, it is often occurred in the molding process that the thicker wall tends to shrink more at the solidification of the resin. Accordingly, using the mold die with the circular cross section for the bore 14, the portion C1 with a thinner wall along the sides 12a shows less shrinkage, while the portion C2 at the corners 12b with a thicker wall shows much shrinkage. Consequently, the bore 14 after the solidification of the resin shows a deformed circular cross section not the completed round such that the length from the center to the side portion 12a is greater than the length from the center to the corner portion 12b, and only the side portion 12a substantially operates to align the ferrule 16.

For instance, an engineering plastic applicable to the sleeve portion 10 generally shows a wide range of the shrinkage at the solidification of 0.1 to 1.2%. Polyetherimide (PEI), which is one of typical engineering plastics, shows the shrinkage of about 0.6%. Applying the PEI to the sleeve portion 10, the shift from the complete roundness, namely the difference in the shrinkage between the side and corner portions; becomes about 3 µm at most for a case where a different in the thickness between two portions is about 0.5 mm.

According to the embodiment shown in FIGS. 1 to 2B, only the side portions 12a substantially contribute to align the ferrule 16 even the tubular portion 11 inherently has the dimensional accuracy due to the press working during the manufacturing process thereof. When the PEI is applied to the sleeve member 10 as the source material thereof, the scattering of the inner dimension of the bore 14 becomes merely about 0.3 µm assuming the scattering of the physical thickness of the side portions 12 to be 0.05 mm. This value for the scattering is substantially negligible.

On the other hand, the wall thickness of the sleeve portion 10 is necessary to be around 0.8 mm, which results in the scattering of the wall thickness after the solidification of about 3 µm. This is significant value for the optical coupling between the single mode fiber and the optical element in the optical device. While, the sleeve portion 10 with the buried member 11 having the polygonal cross section, the wall thickness of the portion C1, which is the side portions of the polygonal cross section and substantially secures and supports the ferrule threat, becomes only about 0.1 to 0.2 mm, and the scattering of the thickness thereof may be suppressed to a level substantially equal to a dimensional accuracy of the mold, which is typically less than 1 µm.

The sleeve portion 10 with the buried member 11 may be also effective to maintain the temperature variation of the bore diameter. The buried member, which may be made of metal, has a less linear thermal expansion coefficient than that of the resin material. Assuming the ambient temperature to be varied from a room temperature to lower temperatures; the radius of the bore 14 shrinks depending on the linear thermal expansion coefficient of the resin member.

Assuming a situation that an ambient temperature of the module varies from a room temperature to a lower temperature, the tubular member 12 shrinks depending on the thermal expansion coefficient thereof, that is, the cross section of the polygonal becomes smaller, but the sleeve portion 10 made of resin, in particular, the bore 14 thereof becomes wider as the temperature decreases. Therefore, by selecting the resin material and the wall thickness at the thin wall portion C1, the radius of the bore 14 may be not only fit the temperature dependence of the radius of the ferrule inserted therein, but also substantially no temperature dependence.

The sleeve member 10 may provide a temperature characteristic depending on the temperature characteristic of the material for the ferrule 16, which is typically made of zirconia. As an example, the buried member 11 may be made of copper alloy or resin containing inorganic filler to enhance the bending strength and the Young's Modulus, whose liner expansion coefficient is $1.9 \times 10^{-5}$ and the Young's Modulus of 110 GPa. While, the resin for the sleeve portion 10 may be made of liquid crystal polymer (LCP) with the linear expansion coefficient of $5 \times 10^{-5}$ and the Young's Modulus of 15 GPa. The temperature variation of the diameter of the bore 14 may become substantially equal to the temperature variation of the outer diameter of the ferrule 16 for the thickness of the tubular portion 11 of 0.4 mm and the wall thickness of the side portions C1 of 0.18 mm. In another condition, in which the tubular member is made of steel with the linear expansion coefficient of $1.2 \times 10^{-5}$ and the Young's Modulus of 206 GPa while the wall thickness at the side portions C1 is 0.2 mm, the temperature variation of the bore diameter 14 becomes substantially zero.

Thus, the temperature variation of the bore diameter may be substantially negligible. That is, selecting the materials for the buried member 11 and the sleeve portion 10 and setting the physical dimension of two members, the ideal bore may be obtained without any temperature variation in the inner diameter thereof or with the temperature variation of the inner diameter fitting with the temperature variation of the outer diameter of the ferrule 16.

The tapered portion 10c not accompanied with the tubular portion 11 has a wall thickness of about 0.8 mm, which shows a substantial shrinkage at the solidification. Accordingly, the present embodiment moderates this shrinkage by the tapered inner surface with a different in the diameter thereof between the interface with the buried member 11 and that with the inlet 14a. The tapered portion 10c does not contribute to align and to secure the ferrule 16. This tapered portion 10c continues with the inlet 14a to guide the ferrule 16.

The thin wall portion C1, which primarily contributes to align and to secure the ferrule 16, has a distance from the center of the sleeve portion 10 slightly smaller than the radius of the ferrule 16 by an amount corresponding to the dimensional scattering due to the solidification. While, the thicker wall portion C2, which does not contributes to align and to secure the ferrule 16, may have a distance from the center of the sleeve portion 10 slightly greater than the radius of the ferrule 16 so as to make a gap therebetween.

The tubular portion 12 may have a triangular cross section so as to support the ferrule 16 stably by three points. The side portions 12a, which is flat with respect to the ferrule 16 inserted into the bore 14, is easy to be elastically deformed along the axial direction. Accordingly, setting the distance from the center of the bore 14 to the thin wall C1 slightly smaller than the outer radius of the ferrule 16, the sleeve portion 10 may securely align and hold the sleeve by expanding the thin wall portion C1 outwardly.

Although the thinner wall portion C1 of the present sleeve portion 10 may enhance the dimensional accuracy originated from the molding die because of its less thickness compared to those conventionally designed sleeve, the ultimate accuracy does not come in comparable with the precisely grinded sleeve made of metal or zirconia ceramics. However, the sleeve portion 10 may securely and rigidly support and hold the ferrule by setting the diameter of the inscribed circle passing the inner surface of the thinner wall portion C1 less than the outer diameter of the ferrule 16.

Moreover, the holding of the ferrule 16 may be performed only by the thin wall portion C1. The thick wall portion C2 at the corner of the tubular member 12 provides the gap to the outer surface of the ferrule 16 inserted therein. Accordingly, the securing force of the ferrule may be relaxed so as to be inconvenient for the insertion or the extraction of the ferrule.

The outer wall 10b may fully encapsulate the corners 12b of the tubular portion 12, that is the outer surface 15 of the sleeve member 10 has a smooth cylindrical surface. However, the outer surface 15 may just correspond to the outer edge of the corner portion 12b of the tubular portion 12. In this case, the corner portion 12b may be an index to define the outer cylindrical surface 15 of the sleeve member 10.

Because the sleeve assembly 7 includes the buried member 11 whose tubular portion 12 has the polygonal cross section, the deformation of the body thereof may be suppressed even a force is applied along the axial direction perpendicular to the axis of the sleeve assembly 7, which may enhance the wiggle tolerance. The polygonal cross section may effectively restrict portions to secure and to hold the sleeve, and it may thin the wall thickness of the securing portion of the ferrule, which may have the scattering of the bore diameter following the scattering of the outer diameter of the ferrule, or may absolutely restrict the scattering of the bore dimension. The thicker wall portion may facilitate the injection of the mold.

Thus, according to the arrangement of the present invention may suppress the scattering of the bore diameter of the sleeve assembly, including the temperature dependence thereof, and may suppress the variation of the smoothness to insert or to extract the ferrule with respect to the sleeve bore. The meal tubular portion or the portion made of electrically conductive resin may enhance the EMI shielding performance by coming it in contact with the ground. Moreover, the tubular portion made of radiation absorber may further enhance the EMI shielding effect.

We claim:

1. An optical module optically coupled with an optical connector, comprising:
    an optical device installing a semiconductor optical element therein;
    a skirt portion attached to said optical device and configured to align said optical device with said optical connector; and
    a sleeve assembly including a sleeve portion with a bore to receive a ferrule therein and a buried member,
    wherein said buried member has a linear thermal expansion coefficient smaller than a liner thermal expansion coefficient of said sleeve portion,
    wherein said buried member is fully buried within said sleeve portion and has a polygonal cross section with a plurality of side portions and a plurality of corner portions so as to surround said bore, and
    wherein said sleeve portion has a thickness from said bore to said side portions of said buried member thinner than a thickness from said bore to said corner portions of said buried member.

2. The optical module according to claim 1,
    wherein said buried member has a Young's Modulus greater than a Young's modulus of said sleeve portion.

3. The optical module according to claim 2,
    wherein said buried member is made of material selected from copper and steel.

4. The optical module according to claim 2,
    wherein said buried member is made of resin containing inorganic filler such that the buried member has a liner expansion coefficient smaller than said linear expansion coefficient of said sleeve member.

5. The optical module according to claim 4,
wherein said sleeve portion is made of engineering plastic including polyetherimide and liquid crystal polymer.

6. The optical module according to claim 1,
wherein said buried member has a triangular cross section with a plurality of side portions and a plurality of corner portions, and
wherein said bore has different distance with respect to a center axis of said bore at said side portions and at said corner portions, said distance at said side portion being less than said distance at said corner portion and being less than an outer radius of said ferrule.

7. The optical module according to claim 1,
wherein said buried member has a triangular cross section with a plurality of side portions and a plurality of corner portions, and
wherein said portions have a wall thickness different from a wall thickness of said corner portions.

8. The optical module according to claim 1,
wherein said sleeve portion provides a tapered portion from an end of said buried member to an inlet of said sleeve portion from which said ferrule is inserted, said bore of said sleeve portion having a diameter gradually increasing from said end of said buried member to said inlet.

9. An optical module optically coupled with an optical connector, comprising:
an optical device that installs a semiconductor optical element therein;
a skirt portion attached to said optical device for aligning said optical device with said optical connector; and
a sleeve assembly including,
    a sleeve portion made of engineering plastic and having a bore to receive a ferrule therein, and
    a buried member made of metal with a polygonal cross section and fully buried within said sleeve portion, said buried member having a linear thermal expansion coefficient smaller than a linear thermal expansion coefficient of said sleeve portion,
wherein said sleeve portion has a thickness from an inner wall of said bore to a side portion of said buried member thinner than a thickness from said inner wall of said bore to a corner portion of said buried member.

10. The optical module according to claim 9,
wherein said sleeve portion is made of material selected from polyetherimide and liquid crystal polymer.

11. The optical module according to claim 9,
wherein said buried member is made of material selected from copper and steel.

12. An optical module optically coupled with an optical connector, comprising:
an optical device installing a semiconductor optical element therein;
a skirt portion attached to said optical device and configured to align said optical device with said optical connector; and
a sleeve assembly including a sleeve portion defining a bore to receive a ferrule therein and a buried member,
wherein said buried member has a linear thermal expansion coefficient smaller than a liner thermal expansion coefficient of said sleeve portion,
wherein said buried member is contained in said sleeve portion,
wherein the buried member has a polygonal cross section with a plurality of side portions and a plurality of corner portions,
wherein inner dimensions of the buried member exceed a radius of the bore, and
wherein said sleeve portion has a thickness from said bore to said side portions of said buried member thinner than a thickness from said bore to said corner portions of said buried member.

* * * * *